United States Patent
Li et al.

(10) Patent No.: US 10,042,217 B2
(45) Date of Patent: Aug. 7, 2018

(54) LIQUID-CRYSTAL DISPLAY

(71) Applicant: InnoLux Corporation, Miao-Li County (TW)

(72) Inventors: Hsueh-Wen Li, Miao-Li County (TW); Mao-Shiang Lin, Miao-Li County (TW); Yu-Sheng Ho, Miao-Li County (TW); Ying-Jen Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/185,255

(22) Filed: Jun. 17, 2016

(65) Prior Publication Data
US 2017/0045788 A1    Feb. 16, 2017

(30) Foreign Application Priority Data
Aug. 13, 2015  (CN) .......................... 2015 1 0495600

(51) Int. Cl.
*G02F 1/1337* (2006.01)
*G02F 1/1335* (2006.01)
*G02F 1/1343* (2006.01)

(52) U.S. Cl.
CPC .. *G02F 1/134309* (2013.01); *G02F 1/133707* (2013.01); *G02F 1/133514* (2013.01)

(58) Field of Classification Search
CPC .................................................. G02F 1/133707
See application file for complete search history.

(56) References Cited

U.S. PATENT DOCUMENTS

| | | | |
|---|---|---|---|
| 8,310,629 B2 * | 11/2012 | Chen ................. | G02F 1/134309 349/106 |
| 2003/0197819 A1 * | 10/2003 | Sunohara .......... | G02F 1/133707 349/113 |
| 2014/0125896 A1 * | 5/2014 | Suwa ................ | G02F 1/133753 349/33 |

* cited by examiner

*Primary Examiner* — Wen-Ying P Chen
(74) *Attorney, Agent, or Firm* — McClure, Qualey & Rodack, LLP

(57) ABSTRACT

A liquid-crystal display includes a first substrate including several sub-pixels. A micro-structure layer is formed on the first substrate, and the micro-structure layer corresponding to one of the sub-pixels includes a first main trunk portion, a second main trunk portion crossed the first main trunk portion, and several striped branch portions. The striped branch portions are connected with the first and second main trunk portions, wherein an angle is formed between the striped branch portions and the first main trunk portion, and the striped branch portions are alternately arranged with a pitch. A first electrode layer is conformally formed on the micro-structure layer. Specifically, the pitch in one of the sub-pixels is different from the pitch in another one of the sub-pixels, or the angle in one of the sub-pixels is different from the angle in another one of the sub-pixels.

6 Claims, 7 Drawing Sheets

LIQUID-CRYSTAL DISPLAY

CROSS REFERENCE TO RELATED APPLICATIONS

The present application claims priority of China Patent Application No. 201510495600.4, filed on Aug. 13, 2015, the entirety of which is incorporated by reference herein.

BACKGROUND OF THE INVENTION

Field of the Invention

The present invention relates to a liquid-crystal display, and in particular to a vertical alignment liquid-crystal display.

Description of the Related Art

The working principle of a liquid-crystal display (LCD) is based on a mixing of light of three primary colors: red (R), green (G), and blue (B). Specifically, each pixel of the LCD is composed of three sub-pixels, a red, a green, and a blue one, and the three sub-pixels are performed with default gray level respectively to display requiring color. When the three sub-pixels are mixed in equal proportions, a white light can be obtained.

Color taste is a very important factor in design of LCD, and it may be quantified by using the CIE 1931 chromaticity coordinate system which defines colors in a plane space and may transfer the tristimulus values (X, Y, Z) of the three primary colors (red, green, and blue) to the chromatic coordinates via the following derived formulas:

$$x = \frac{X}{X+Y+Z} \quad y = \frac{Y}{X+Y+Z} \quad z = \frac{Z}{X+Y+Z} = 1 - x - y$$

Specifically, the red tristimulus value X is mainly contributed by the red sub-pixel, the green tristimulus value Y is mainly contributed by the green sub-pixel, and the blue tristimulus value Z is mainly contributed by the blue sub-pixel.

In general, a shade of white light usually occurs when the brightness of the LCD is increased. It is because the brightness gain (BZ) of the blue sub-pixel is much less than the brightness gain (RX) of the red sub-pixel and the brightness gain (GY) of the green sub-pixel and resulting in shift of the chromatic coordinates (Wx, Wy) of white light.

Therefore, an LCD which can adjust the shifted chromatic coordinates of white light to reduce the problem of having a shade of white light is needed.

BRIEF SUMMARY OF THE INVENTION

An embodiment of the invention provides a liquid-crystal display, comprising a first substrate, a first electrode layer, a second substrate, a second electrode layer, and a liquid-crystal layer. The first substrate includes a plurality of sub-pixels. The first electrode layer is formed on the first substrate, and the first electrode layer corresponding to one of the sub-pixels includes a first main trunk, a second main trunk crossed the first main trunk, and a plurality of striped branches. The striped branches are connected with the first and second main trunks, an angle is formed between the striped branches and the first main trunk in the one of the sub-pixels, and the striped branches are alternately arranged with a pitch in the one of the sub-pixels. The second substrate is opposing the first substrate. The second electrode layer is formed on the second substrate. The liquid-crystal layer is disposed between the first and second electrode layers. Specifically, the pitch in one of the sub-pixels is different from the pitch in another one of the sub-pixels, or the angle in one of the sub-pixels is different from the angle in another one of the sub-pixels.

In some embodiments, the first substrate further includes a plurality of pixels, and one of the pixels has a red sub-pixel, a green sub-pixel, and a blue sub-pixel, wherein the pitch of the striped branches in the blue sub-pixel is smaller than the pitches in the red sub-pixel and the green sub-pixel.

In some embodiments, the difference in the pitches between the blue sub-pixel and the red sub-pixel and between the blue sub-pixel and the green sub-pixel is 1 micrometer to 8 micrometer.

In some embodiments, the first substrate further includes a plurality of pixels, and one of the pixels has a red sub-pixel, a green sub-pixel, and a blue sub-pixel, wherein the angle between the striped branches and the first main trunk in the blue sub-pixel is smaller than the angles in the red sub-pixel and the green sub-pixel.

In some embodiments, the difference in the angles between the blue sub-pixel and the red sub-pixel and between the blue sub-pixel and the green sub-pixel is 1 degree to 30 degree.

Another embodiment of the invention also provides a liquid-crystal display, comprising a first substrate, a micro-structure layer, a first electrode layer, a second substrate, a second electrode layer, and a liquid-crystal layer. The first substrate includes a plurality of sub-pixels. The micro-structure layer is formed on the first substrate, and the micro-structure layer corresponding to one of the sub-pixels includes a first main trunk portion, a second main trunk portion crossed the first main trunk portion, and a plurality of striped branch portions. The striped branch portions are connected with the first and second main trunk portions, and an angle is formed between the striped branch portions and the first main trunk portion in the one of the sub-pixels, and the striped branch portions are alternately arranged with a pitch in the one of the sub-pixels. The first electrode layer is conformally formed on the micro-structure layer. The second substrate is opposing the first substrate. The second electrode layer is formed on the second substrate. The liquid-crystal layer is disposed between the first and second electrode layers. Specifically, the pitch in one of the sub-pixels is different from the pitch in another one of the sub-pixels, or the angle in one of the sub-pixels is different from the angle in another one of the sub-pixels In some embodiments, the first substrate further includes a plurality of pixels, and one of the pixels has a red sub-pixel, a green sub-pixel, and a blue sub-pixel, wherein the pitch of the striped branch portions in the blue sub-pixel is smaller than the pitches in the red sub-pixel and the green sub-pixel.

In some embodiments, the difference in the pitches between the blue sub-pixel and the red sub-pixel and between the blue sub-pixel and the green sub-pixel is 1 micrometer to 8 micrometer.

In some embodiments, the first substrate further includes a plurality of pixels, and one of the pixels has a red sub-pixel, a green sub-pixel, and a blue sub-pixel, and wherein the angle between the striped branch portions and the first main trunk portion in the blue sub-pixel is smaller than the angles in the red sub-pixel and the green sub-pixel.

In some embodiments, the difference in the angles between the blue sub-pixel and the red sub-pixel and between the blue sub-pixel and the green sub-pixel is 1 degree to 30 degree.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
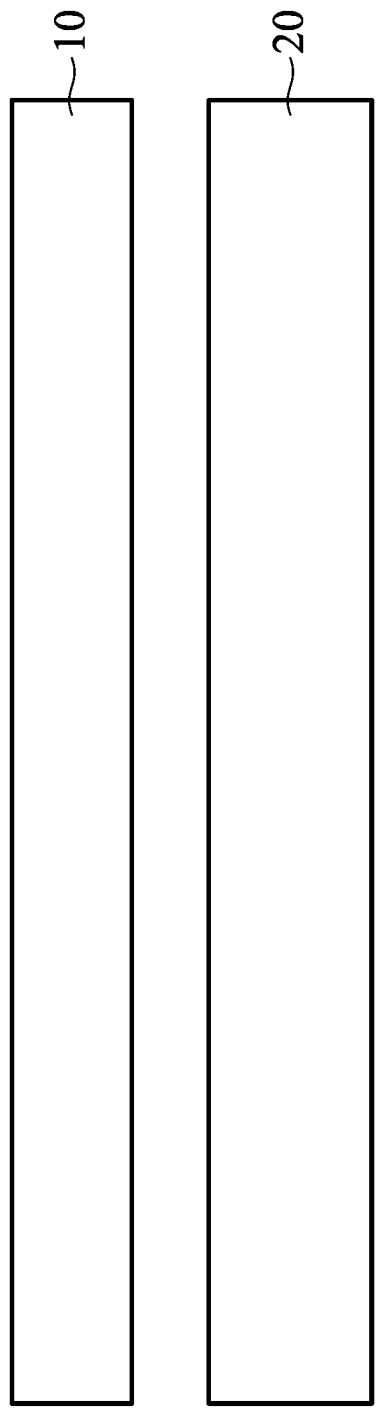
FIG. 1 is a cross-sectional view of a liquid-crystal display in accordance with an embodiment of the invention.

In order to illustrate the purposes, features and advantages of the invention, the preferred embodiments and figures of the invention are shown in detail as follows.

In the following detailed description, the orientations of "on", "over", "under", and "below" are used for representing the relationship between the relative positions of each element as illustrated in the drawings, and are not meant to limit the invention. Moreover, the formation of a first material layer over or on a second material layer in the description that follows may include embodiments in which the first and second material layers are formed in direct contact, or the first and second material layers have one or more additional material layers formed therebetween.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Figure 2:
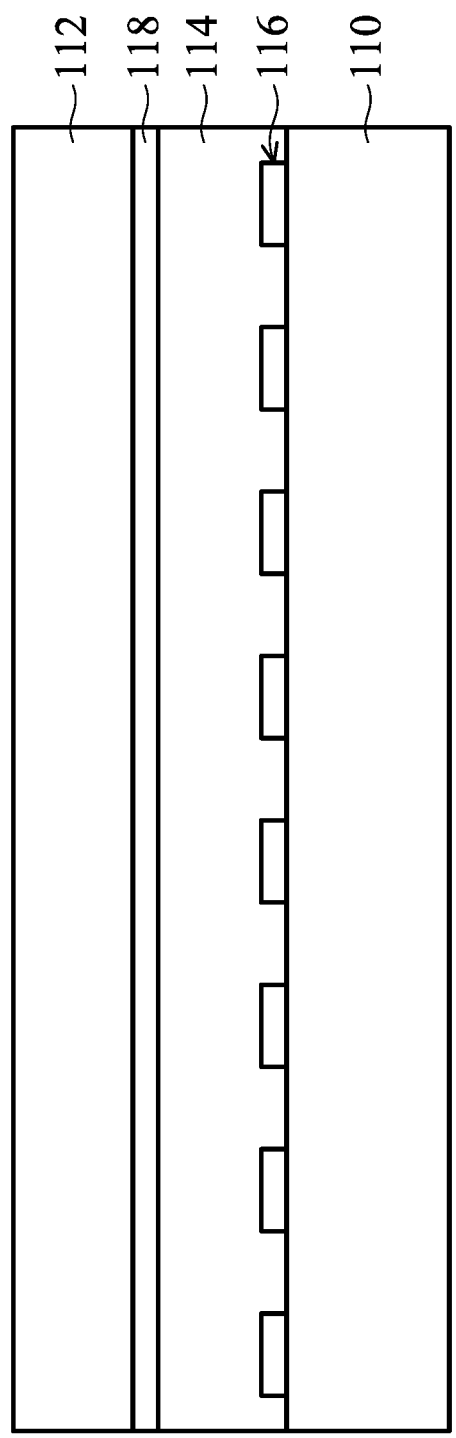
FIG. 2 is a cross-sectional view of a liquid-crystal panel in FIG. 1 in accordance with an embodiment of the invention.

FIG. 1 is a cross-sectional view of a liquid-crystal display in accordance with an embodiment of the invention. FIG. 2 is a cross-sectional view of a liquid-crystal panel in FIG. 1 in accordance with an embodiment of the invention.

As shown in FIG. 1 and FIG. 2, the liquid-crystal display 1 according to an embodiment of the invention includes a liquid-crystal panel 10 and a backlight module 20. The backlight module 20 provides light to the liquid-crystal panel 10 and each pixel of the liquid-crystal panel 10 can control the light transmittance to display a color image. The liquid-crystal panel 10 includes a first substrate 110, a second substrate 112, a liquid-crystal layer 114, a first electrode layer 116, and a second electrode layer 118. Specifically, the first substrate 110 may be a Thin-Film Transistor (TFT) array substrate including thin-film transistors (not shown). The second substrate 112 may be a color filter substrate including color filter layers (not shown). The liquid-crystal layer 114 is disposed between the first and second substrates 110 and 112. The first electrode layer 116 may be a patterned pixel electrode layer formed on the first substrate 110 and electrically connects to the thin-film transistors. The second electrode layer 118 may a common electrode layer formed on the second substrate 112 and opposing the first electrode layer 116. In this embodiment, the liquid-crystal panel 10 is a vertical alignment (VA) type liquid-crystal panel.

In some embodiments, the first substrate 110 and the second substrate 112 may comprise glass substrates, transparent acrylic substrates, or flexible substrates, and the liquid-crystal layer 114 may comprise negative liquid-crystal molecules. In some embodiments, the liquid-crystal layer 114 may be a polymer stabilized vertical alignment (PSVA) liquid-crystal layer. In some embodiments, the first electrode layer 116 and the second electrode layer 118 may comprise indium tin oxide (ITO) or indium zinc oxide (IZO). In addition, the liquid-crystal panel 10 may further include a pair of alignment layers (not shown) formed on the inner sides of the first and second substrates 110 and 112, and a pair of polarizers (not shown) formed on the outer sides of the first and second substrates 110 and 112. The pair of alignment layers is configured to control arrangement directions of the liquid-crystal molecules by friction. The pair of polarizers have optical axes in, for example, directions of an angle of 0 degree and 90 degree respectively (the pair of polarizers are orthogonal to each other), so that a brighter image is created due to the orientation ($\Phi$) of the liquid-crystal molecules being at 45 degree.

Figure 3A:
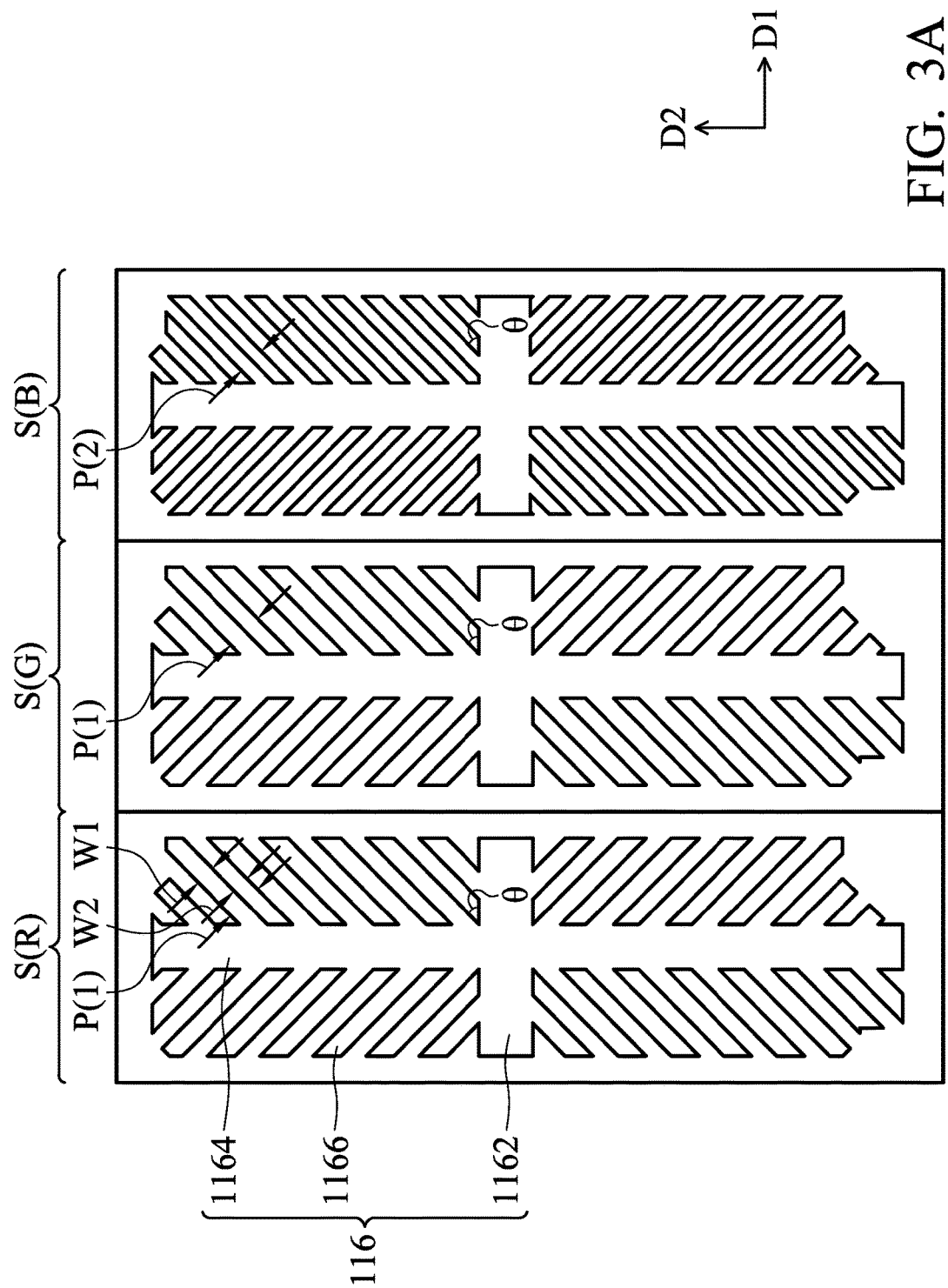
FIGS. 3A and 3B are top views of a first electrode layer in FIG. 2 in a pixel in accordance with various embodiments of the invention.

Please refer to FIG. 3A, which is a top view of the first electrode layer 116 in FIG. 2 in a pixel in accordance with an embodiment of the invention. As shown in FIG. 3A, each pixel of the first substrate include three sub-pixels S that are, sequentially from left to right: a red sub-pixel S(R), a green sub-pixel S(G), and a blue sub-pixel S(B). Specifically, the first electrode layer 116 corresponding to one of the sub-pixels S includes a first main trunk 1162 along a first direction D1 (i.e. the horizontal direction in the drawing), a second main trunk 1164 along a second direction D2 (i.e. the vertical direction in the drawing) different from the first direction D1, and a plurality of striped branches 1166. In FIG. 3A, the first main trunk 1162 and the second main trunk 1164 intersect perpendicularly, but the invention is not limited thereto. The striped branches 1166 are connected with the first and second main trunks 1162 and 1164, and an angle $\theta$ is formed between the striped branches 1166 and the first main trunk 1162 in the sub-pixels S. Moreover, the striped branches 1166 are alternately arranged with a fixed pitch P in the sub-pixels S, wherein the definition of the pitch P is the sum (in microns ($\mu$m)) of the width (W1 as shown in FIG. 3A) of a single striped branch 1166 and the distance (W2 as shown in FIG. 3A) of the spacing between adjacent striped branches 1166, that is equivalent to the distance between the same point on two adjacent striped branches 1166. In some embodiments, the width W1 of each striped branch 1166 and the distance W2 of the spacing between adjacent striped branches 1166, in the same sub-pixel S, may be different or the same.

The embodiment of FIG. 3A is characterized by the angles $\theta$ between each of the striped branches 1166 and the first main trunk 1162 in the three sub-pixels S being the same: for example, they may be 45 degree. Moreover, the pitch P(2) of the striped branches 1166 in the blue sub-pixel S(B) is different from the pitches P(1) of striped branches 1166 in the red sub-pixel S(R) and the green sub-pixel S(G), for example, the pitches P(1) of striped branches 1166 in the red sub-pixel S(R) and the green sub-pixel S(G) are both 10 micrometer, and the pitch P(2) of the striped branches 1166 in the blue sub-pixel S(B) is 7 micrometer, smaller than the pitches P(1). In some embodiments, the difference (i.e. P(1)-P(2)) between the pitch P(2) and the pitches P(1) may also range between 1 micrometer and 8 micrometer.

TABLE 1

| | Sub-pixel | | | chromatic coordinates | |
|---|---|---|---|---|---|
| | S(R) | S(G) | S(B) | Wx | Wy |
| Pitch (μm) | 10 | 10 | 10 | 0.283 | 0.293 |
| | 10 | 10 | 6 | 0.276 | 0.283 |

From the simulation results of the chromatic coordinates shown in Table 1, it can be obtained that: When the pitch P(2) of the striped branches 1166 in the blue sub-pixel S(B) and the pitches P(1) of the striped branches 1166 in the red sub-pixel S(R) and the green sub-pixel S(G) are the same (e.g. all 10 micrometer), the chromatic coordinates (Wx, Wy) of white light are (0.283, 0.293); whereas, when the pitch P(2) of the striped branches 1166 in the blue sub-pixel S(B) becomes smaller (e.g. from 10 micrometer to 6 micrometer), the chromatic coordinates (Wx, Wy) of white light are changed to (0.276, 0.283). Accordingly, the chromatic coordinates of white light can be adjusted by changing the pitch of the striped branches in one of the sub-pixels.

It should be realized that, in this embodiment (FIG. 3A), when the pitch P of the striped branches 1166 becomes smaller, the strength of the electric field between the first electrode layer 116 and the second electrode layer 118 (FIG. 2) is increased, thereby improving the efficiency and transmittance of the liquid-crystal layer 114 (FIG. 2). Consequently, when the pitch P(2) of the striped branches 1166 in the blue sub-pixel S(B) becomes smaller, the blue tristimulus value Z is effectively increased, so that the chromatic coordinates of white light can be adjusted to reduce the shift of white light.

Figure 3B:
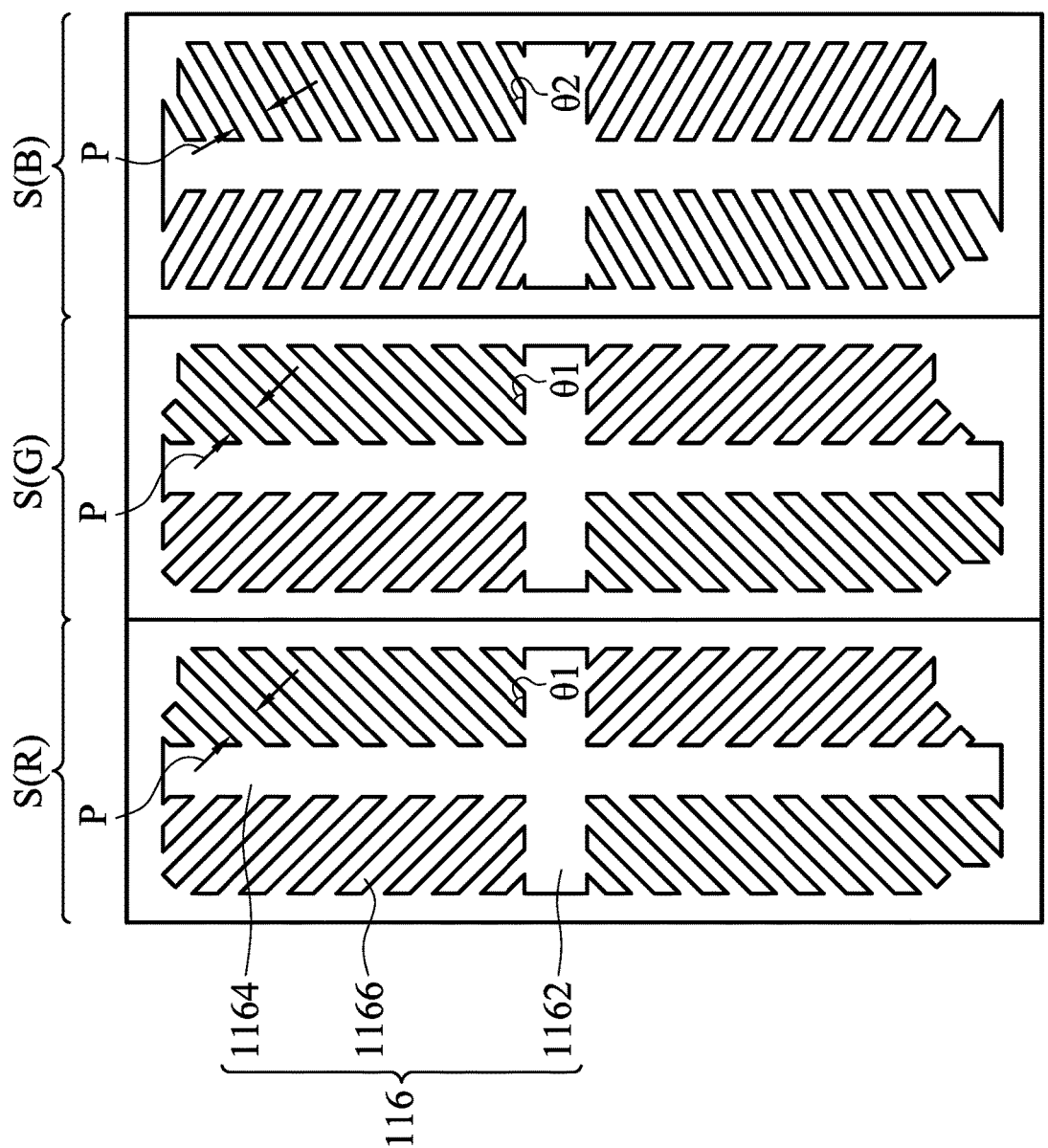

Next, please refer to FIG. 3B, which is a top view of the first electrode layer 116 in FIG. 2 in a pixel in accordance with another embodiment of the invention. This embodiment differs from the embodiment of FIG. 3A in that the pitches P of the striped branches 1166 in the three sub-pixels S are the same, for example, may be 10 micrometer. Moreover, the angle θ2 between each of the striped branches 1166 and the first main trunk 1162 in the blue sub-pixel S(B) is different from the angles θ1 between each of the striped branches 1166 and the first main trunk 1162 in the red sub-pixel S(R) and the green sub-pixel S(G), for example, the angles θ1 in the red sub-pixel S(R) and the green sub-pixel S(G) are both 45 degree, and the angle θ2 in the blue sub-pixel S(B) is 30 degree, smaller than the θ1. In some embodiments, the difference (i.e. θ1-θ2) between the angle θ2) and the angles θ1 ranges between 1 degree and 30 degree.

TABLE 2

| | Sub-pixel | | | chromatic coordinates | |
|---|---|---|---|---|---|
| | S(R) | S(G) | S(B) | Wx | Wy |
| Angle (degree) | 45 | 45 | 45 | 0.283 | 0.293 |
| | 45 | 45 | 30 | 0.273 | 0.281 |

From the simulation results of the chromatic coordinates shown in Table 2, it can be obtained that: When the angle between each of the striped branches 1166 and the first main trunk 1162 in the blue sub-pixel S(B), the red sub-pixel S(R) and the green sub-pixel S(G) are the same (e.g. all 45 degree), the chromatic coordinates (Wx, Wy) of white light are (0.283, 0.293); whereas, when the angle θ2 in the blue sub-pixel S(B) becomes smaller (e.g. from 45 degree to 30 degree), the chromatic coordinates (Wx, Wy) of white light are changed to (0.273, 0.281). Accordingly, the chromatic coordinates of white light can be adjusted by changing the angle between the striped branches and the first main trunk in one of the sub-pixels.

It should be realized that, in this embodiment (FIG. 3B), when the angle θ becomes smaller, the whole orientation (Φ) of the liquid-crystal molecules in the liquid-crystal layer 114 (FIG. 2) can be relatively close to an angle of 45 degree, thereby improving the efficiency and transmittance of the liquid-crystal molecules. Consequently, when the angle θ2 in the blue sub-pixel S(B) becomes smaller, the blue tristimulus value Z is effectively increased, so that the chromatic coordinates of white light can be adjusted to reduce the problem of having a shade of yellow in white light.

Figure 4:
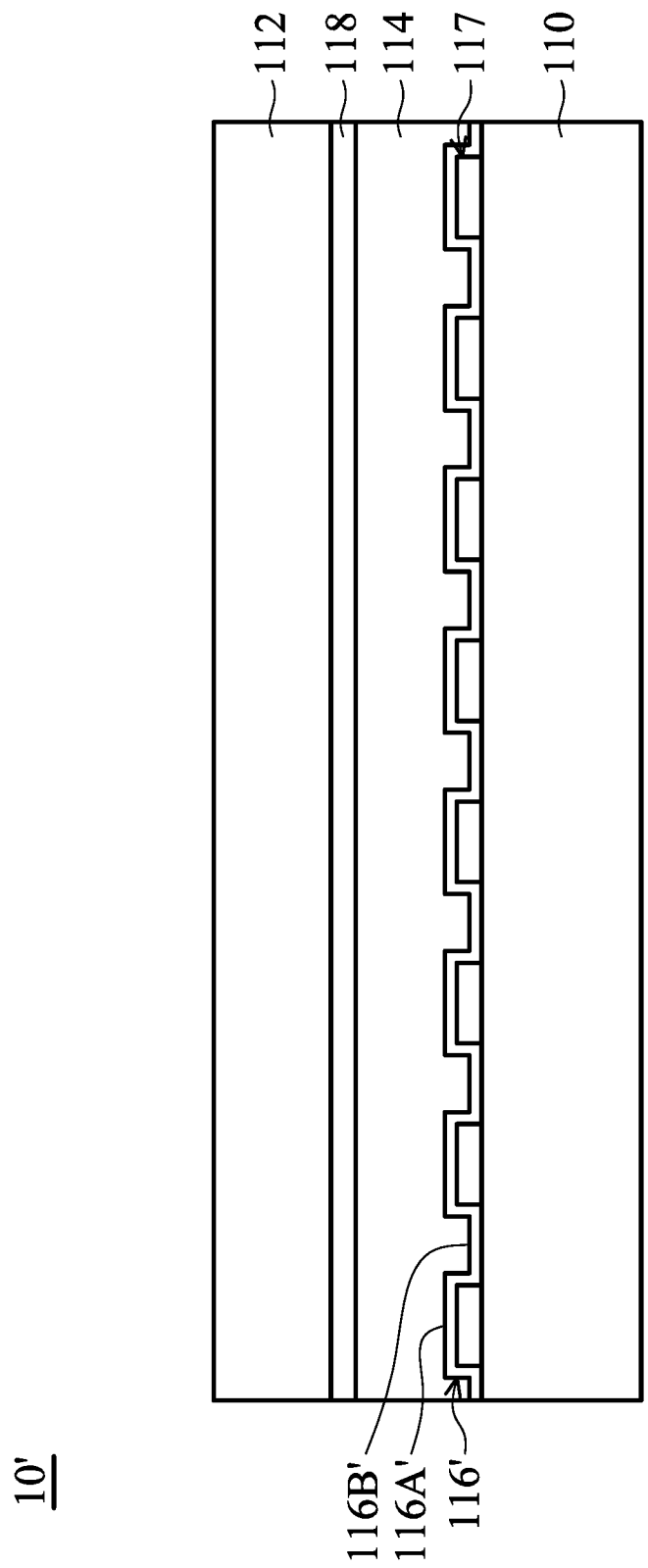
FIG. 4 is a cross-sectional view of a liquid-crystal panel in FIG. 1 in accordance with another embodiment of the invention.

FIG. 4 is a cross-sectional view of a liquid-crystal panel 10' in FIG. 1 in accordance with another embodiment of the invention. As shown in FIG. 4, the liquid-crystal panel 10' includes a first substrate 110, a second substrate 112, a liquid-crystal layer 114, a first electrode layer 116', a micro-structure layer 117, and a second electrode layer 118. The first substrate 110, the second substrate 112, the liquid-crystal layer 114, and the second electrode layer 118 are the same as the disclosures in the embodiment of FIG. 2, and thus are not repeated here. In addition, in this embodiment (FIG. 4), the micro-structure layer 117 may be a patterned and transparent insulation material (e.g. nitride) layer formed on the first substrate 110. The first electrode layer 116' may be a transparent electrode layer (comprising ITO or IZO) which is conformally formed on the micro-structure layer 117 and opposing the second electrode layer 118.

It should be realized that, the first electrode layer 116' formed with protruded structures 116A' (corresponding to the protruded structures of the micro-structure layer 117 and corresponding to the first and second main trunk portions, and the striped branch portions) and depressed structures 116B' (corresponding to the slots between the protruded structures of the micro-structure layer 117) is similar to the first electrode layer 116 in the embodiment of FIG. 2 and can co-operate with the second electrode layer 118 to generate a vertical electric field to control the arrangement of liquid-crystal molecules in the liquid-crystal layer 114. That is, the liquid-crystal panel 10' of this embodiment is also a vertical alignment (VA) type liquid-crystal panel. However, the first electrode layer 116' of this embodiment has a full-cladding film in a sub-pixel as a pixel electrode, it can generate a more uniform electric field compared with the patterned first electrode layer 116 in the embodiment of FIG. 2, so as to make the liquid-crystal molecules arranged more consistent, thereby preventing an image with bright and dark fringes from being created.

Figure 5A:
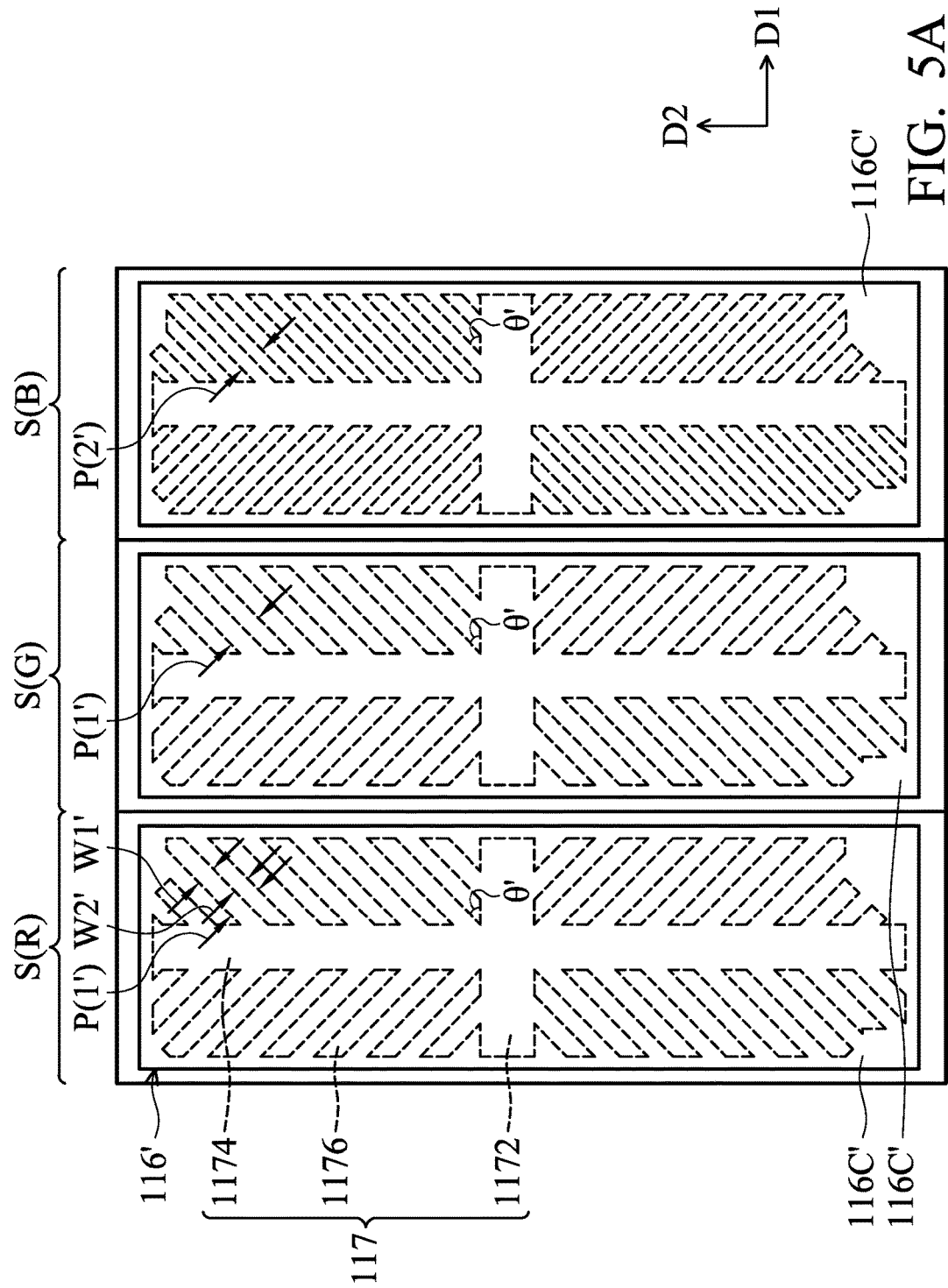
FIGS. 5A and 5B are top views of a micro-structure layer and a first electrode layer in FIG. 4 in a pixel in accordance with various embodiments of the invention.

Please refer to FIG. 5A, which is a top view of the micro-structure layer 117 and the first electrode layer 116' in FIG. 4 in a pixel in accordance with an embodiments of the invention. As shown in FIG. 5A, each pixel of the first substrate 110 (FIG. 4) includes three sub-pixels S that are, sequentially from left to right: a red sub-pixel S(R), a green sub-pixel S(G), and a blue sub-pixel S(B). Specifically, the micro-structure layer 117 corresponding to one of the sub-pixels S includes a first main trunk portion 1172 along a first direction D1 (i.e. the horizontal direction in the drawing), a second main trunk portion 1174 along a second direction D2 (i.e. the vertical direction in the drawing) different from the first direction D1, and a plurality of striped branch portions 1176. In FIG. 5A, the first main trunk portion 1172 and the second main trunk portion 1174 intersect perpendicularly, but the invention is not limited thereto. The striped branch portions 1176 are connected with the first and second main trunk portions 1172 and 1174, and an angle θ' is formed between the striped branch portions 1176 and the first main trunk portion 1172 in the sub-pixels S. Moreover, the striped branch portions 1176 are alternately arranged with a fixed pitch P' in the sub-pixels S, wherein the definition of the pitch P' is the sum (in microns (μm)) of the width (W1' as shown in FIG. 5A) of one striped branch portion 1176 and the distance (W2' as shown in FIG. 5A) of the spacing between two adjacent striped branch portions 1176, that is equivalent to the distance between the same point on two adjacent striped branch portions 1176. In some embodiments, the width W1' of each striped branch portion 1176 and the distance W2' of the spacing between two adjacent striped branch portions 1176, in the same sub-pixel, may be different or the same. In the embodiment of FIG. 5A, the first electrode layer 116' includes a plurality of portions (pixel electrodes) 116C' which entirely cover the micro-structure layer 117 in one sub-pixels S respectively and which are electrically insulated from each other.

The embodiment of FIG. 5A is characterized by the angles θ' between each of the striped branch portions 1176 and the first main trunk portion 1172 in the three sub-pixels S being the same: for example, 45 degree. Moreover, the pitch P(2') in the blue sub-pixel S(B) is different from the pitches P(1') in the red sub-pixel S(R) and the green sub-pixel S(G), for example, the pitches P(1') in the red sub-pixel S(R) and the green sub-pixel S(G) are both 10 micrometer, and the pitch P(2') in the blue sub-pixel S(B) is 7 micrometer, smaller than the pitches P(1'). In some embodiments, the difference (i.e. P(1')-P(2')) between the pitch P(2') in the blue sub-pixel S(B) and the pitches P(1') in the red sub-pixel S(R) and the green sub-pixel S(G) may arrange between 1 micrometer and 8 micrometer.

TABLE 3

|  | Sub-pixel | | | chromatic coordinates | |
|---|---|---|---|---|---|
|  | S(R) | S(G) | S(B) | Wx | Wy |
| Pitch (μm) | 10 | 10 | 10 | 0.283 | 0.293 |
|  | 10 | 10 | 6 | 0.276 | 0.283 |

From the simulation results of the chromatic coordinates shown in Table 3, it can be obtained that: When the pitch in the blue sub-pixel S(B), the red sub-pixel S(R) and the green sub-pixel S(G) are the same (e.g. all 10 micrometer), the chromatic coordinates (Wx, Wy) of white light are (0.283, 0.293); whereas, when the pitch P(2') in the blue sub-pixel S(B) is smaller (e.g. from 10 micrometer to 6 micrometer), the chromatic coordinates (Wx, Wy) of white light are changed to (0.276, 0.283). Accordingly, the chromatic coordinates of white light can be adjusted by changing the pitch in one of the sub-pixels. In this embodiment, by reducing the pitch P(2') in the blue sub-pixel S(B), the blue tristimulus value Z is effectively increased (this working principle has been described in the embodiment of FIG. 3A and thus is not been repeated here), so that the chromatic coordinates of white light can be adjusted to reduce the problem of having a shade of yellow in white light.

Figure 5B:
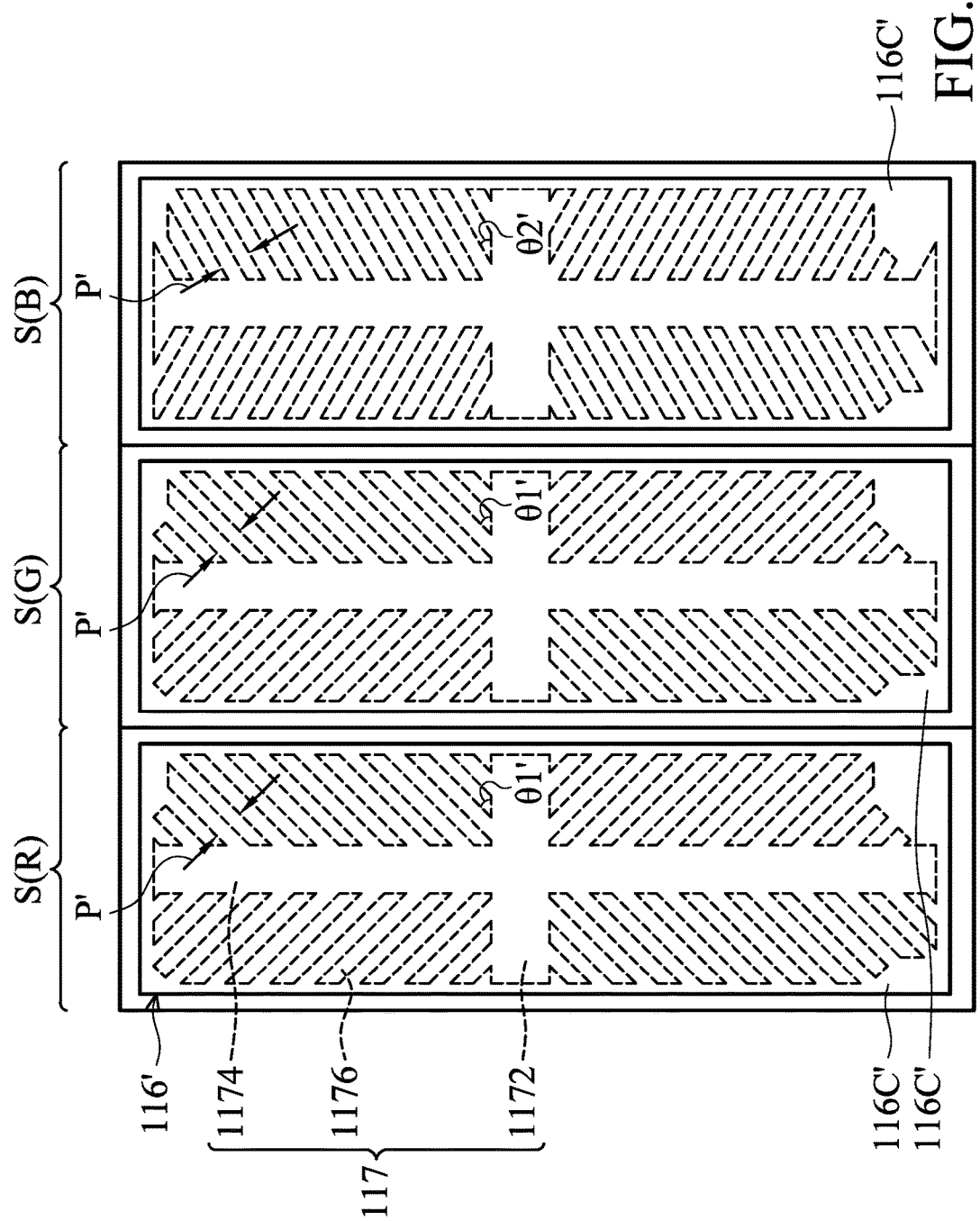

Next, please refer to FIG. 5B, which is a top view of the micro-structure layer 117 and the first electrode layer 116' in FIG. 4 in a pixel in accordance with another embodiment of the invention. This embodiment differs from the embodiment of FIG. 5A in that the pitches P' in the three sub-pixels S are the same, for example, may be 10 micrometer. However, the angle θ2' between each of the striped branch portions 1176 and the first main trunk portion 1172 in the blue sub-pixel S(B) is different from the angles θ1' in the red sub-pixel S(R) and the green sub-pixel S(G), for example, the angles θ1' in the red sub-pixel S(R) and the green sub-pixel S(G) are both 45 degree, and the angle θ2' in the blue sub-pixel S(B) is 30 degree, smaller than the angles θ1'. In some embodiments, the difference (i.e. θ1'-θ2') between the angle θ2' in the blue sub-pixel S(B) and the angle θ1' in the red sub-pixel S(R) or the green sub-pixel S(G) is between 1 degree and 30 degree.

TABLE 4

|  | Sub-pixel | | | chromatic coordinates | |
|---|---|---|---|---|---|
|  | S(R) | S(G) | S(B) | Wx | Wy |
| Angle (degree) | 45 | 45 | 45 | 0.283 | 0.293 |
|  | 45 | 45 | 30 | 0.273 | 0.281 |

From the simulation results of the chromatic coordinates shown in Table 4, it can be obtained that: When the angle in the blue sub-pixel S(B), red sub-pixel S(R) and the green sub-pixel S(G) are the same (e.g. e all 45 degree), the chromatic coordinates (Wx, Wy) of white light are (0.283, 0.293); whereas, when the angle θ2' in the blue sub-pixel S(B) is smaller (e.g. from 45 degree to 30 degree), the chromatic coordinates (Wx, Wy) of white light are changed to (0.273, 0.281). Accordingly, the chromatic coordinates of white light can be adjusted by changing the angle between each of the striped branch portions and the first main trunk portion in one of the sub-pixels. In this embodiment, by reducing the angle θ2' in the blue sub-pixel S(B), the blue tristimulus value Z is effectively increased (this working principle has been described in the embodiment of FIG. 3B and thus is not repeated here), so that the chromatic coordinates of white light can be adjusted to reduce the problem of having a shade of yellow in white light.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid-crystal display, comprising:
   a first substrate including a plurality of sub-pixels and a plurality of pixels, wherein one of the pixels has a red sub-pixel, a green sub-pixel, and a blue sub-pixel;
   a first electrode layer formed on the first substrate, and the first electrode layer corresponding to one of the sub-pixels includes a first main trunk, a second main trunk crossed the first main trunk, and a plurality of striped branches, wherein the striped branches are connected with the first and second main trunks, an angle is formed between one of the striped branches and the first main trunk in the one of the sub-pixels, and the striped branches are alternately arranged with a pitch in the one of the sub-pixels;

a second substrate opposing the first substrate;

a second electrode layer formed on the second substrate; and a liquid-crystal layer disposed between the first and second electrode layers;

wherein the pitch in one of the sub-pixels is different from the pitch in another one of the sub-pixels, or the angle in one of the sub-pixels is different from the angle in another one of the sub-pixels, and wherein the pitch of the striped branches in the blue sub-pixel is smaller than the pitches in the red sub-pixel and the green sub-pixel, and a difference in the pitches between the blue sub-pixel and the red sub-pixel and between the blue sub-pixel and the green sub-pixel is 1 micrometer to 8 micrometers.

2. The liquid-crystal display as claimed in claim 1, wherein the angle between the striped branches and the first main trunk in the blue sub-pixel is smaller than the angles in the red sub-pixel and the green sub-pixel.

3. The liquid-crystal display as claimed in claim 2 wherein a difference in the angles between the blue sub-pixel and the red sub-pixel and between the blue sub-pixel and the green sub-pixel is 1 degree to 30 degree.

4. A liquid-crystal display, comprising:

a first substrate including a plurality of sub-pixels and a plurality of pixels, wherein one of the pixels has a red sub-pixel, a green sub-pixel, and a blue sub-pixel;

a micro-structure layer formed on the first substrate, and the micro-structure layer corresponding to one of the sub-pixels includes a first main trunk portion, a second main trunk portion crossed the first main trunk portion, and a plurality of striped branch portions, wherein the striped branch portions are connected with the first and second main trunk portions, an angle is formed between the striped branch portions and the first main trunk portion in the one of the sub-pixels, and the striped branch portions are alternately arranged with a pitch in the one of the sub-pixels;

a first electrode layer conformally formed on the micro-structure layer;

a second substrate opposing the first substrate;

a second electrode layer formed on the second substrate; and a liquid-crystal layer disposed between the first and second electrode layers;

wherein the pitch in one of the sub-pixels is different from the pitch in another one of the sub-pixels, or the angle in one of the sub-pixels is different from the angle in another one of the sub-pixels, and wherein the pitch of the striped branch portions in the blue sub-pixel is smaller than the pitches in the red sub-pixel and the green sub-pixel, and a difference in the pitches between the blue sub-pixel and the red sub-pixel and between the blue sub-pixel and the green sub-pixel is 1 micrometer to 8 micrometers.

5. The liquid-crystal display as claimed in claim 4, wherein the angle between the striped branch portions and the first main trunk portion in the blue sub-pixel is smaller than the angles in the red sub-pixel and the green sub-pixel.

6. The liquid-crystal display as claimed in claim 5 wherein a difference in the angles between the blue sub-pixel and the red sub-pixel and between the blue sub-pixel and the green sub-pixel is 1 degree to 30 degree.

\* \* \* \* \*